(12) United States Patent
Ding et al.

(10) Patent No.: US 11,680,849 B2
(45) Date of Patent: Jun. 20, 2023

(54) CONTINUOUS UTILITY POLE HEALTH MONITORING BASED ON FINITE ELEMENT ANALYSIS AND OPERATIONAL MODAL ANALYSIS USING DAS

(71) Applicant: NEC Laboratories America, Inc., Princeton, NJ (US)

(72) Inventors: Yangmin Ding, North Brunswick, NJ (US); Yue Tian, Princeton, NJ (US); Sarper Ozharar, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 87 days.

(21) Appl. No.: 17/227,313

(22) Filed: Apr. 10, 2021

(65) Prior Publication Data

US 2021/0318163 A1 Oct. 14, 2021

Related U.S. Application Data

(60) Provisional application No. 63/008,933, filed on Apr. 13, 2020.

(51) Int. Cl.
| | |
|---|---|
| *G06F 30/23* | (2020.01) |
| *G01H 9/00* | (2006.01) |
| *G08B 21/18* | (2006.01) |
| *G06N 20/00* | (2019.01) |

(52) U.S. Cl.
CPC .......... *G01H 9/004* (2013.01); *G08B 21/182* (2013.01); *G06N 20/00* (2019.01)

(58) Field of Classification Search
CPC ...... G01H 9/004; G08B 21/182; G06N 20/00; G06F 30/18; G06F 30/23; G06F 2113/04
See application file for complete search history.

(56) References Cited

PUBLICATIONS

Mohd Fahmi Hussin, Voltage Transducer for Fault Monitoring on High Voltage Overhead Lines, 2014, Ph.D. Degree Thesis, School of Engineering, Electrical Division, Cardiff University, 172 pp. (Year: 2014).*

* cited by examiner

*Primary Examiner* — Toan M Le
(74) *Attorney, Agent, or Firm* — Joseph Kolodka

(57) ABSTRACT

Aspects of the present disclosure describe distributed fiber optic sensing (DFOS) systems, methods, and structures that advantageously enable and/or facilitate the continuous monitoring and identification of damaged utility poles by employing a DFOS distributed acoustic sensing (DAS) methodology in conjunction with a finite element analysis and operational modal analysis. Of particular advantage and in further contrast to the prior art, systems, methods, and structures according to aspects of the present disclosure utilize existing optical fiber supported/suspended by the utility poles as a sensing medium for the DFOS/DAS operation.

7 Claims, 6 Drawing Sheets

CONTINUOUS UTILITY POLE HEALTH MONITORING BASED ON FINITE ELEMENT ANALYSIS AND OPERATIONAL MODAL ANALYSIS USING DAS

CROSS REFERENCE

This disclosure claims the benefit of U.S. Provisional Patent Application Ser. No. 63/008,933 filed 13 Apr. 2020 the entire contents of which is incorporated by reference as if set forth at length herein.

TECHNICAL FIELD

This disclosure relates generally to distributed fiber optic sensing (DFOS) systems, methods, and structures to provide continuous health monitoring of utility poles based on finite element analysis and operational modal analysis (OMA) using distributed acoustic sensing (DAS).

BACKGROUND

There are over 150 million wood utility poles currently in service in the United States and which provide support to wires, cables, and fibers that provide electrical, entertainment, and informational services to homes, and businesses—among others. A known problem with such wood poles—even chemically treated ones—is that they experience decay or other structural defects that may not be readily observable by inspection—even carefully performed ones. Given the number of utility poles in service and the essential facilities and services they provide and their importance in contemporary society, systems, methods, and structures which facilitate identification of utility pole damage would represent a significant advance in the art.

SUMMARY

An advance in the art is made according to aspects of the present disclosure directed to distributed fiber optic sensing systems (DFOS), methods, and structures that advantageously enable and/or facilitate the continuous monitoring and identification of damaged utility poles. In sharp contrast to the prior art, systems, methods and structures according to aspects of the present disclosure employ a DFOS distributed acoustic sensing (DAS) methodology in conjunction with a finite element analysis and operational modal analysis. Of particular advantage and in further contrast to the prior art, systems, methods, and structures according to aspects of the present disclosure utilize any existing optical fiber supported by the utility poles as a sensing medium for the DFOS operation.

BRIEF DESCRIPTION OF THE DRAWING

A more complete understanding of the present disclosure may be realized by reference to the accompanying drawing in which.

DESCRIPTION

Figure 1:
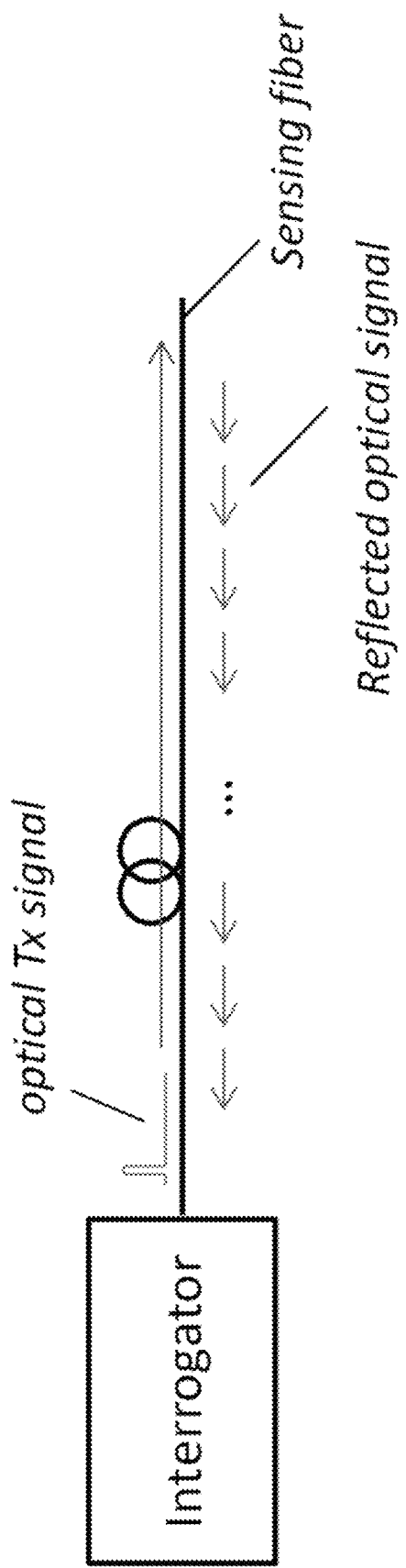
FIG. 1 is a schematic diagram of an illustrative distributed fiber optic sensing system and operation generally known in the art.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator.

The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DAS (Distributed Acoustic Sensor) interrogator to recover a vibration occurring anywhere along a sensing fiber in equivalent sampling frequency of the pulse repetition rate. For example, for a DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule.

Figure 2:
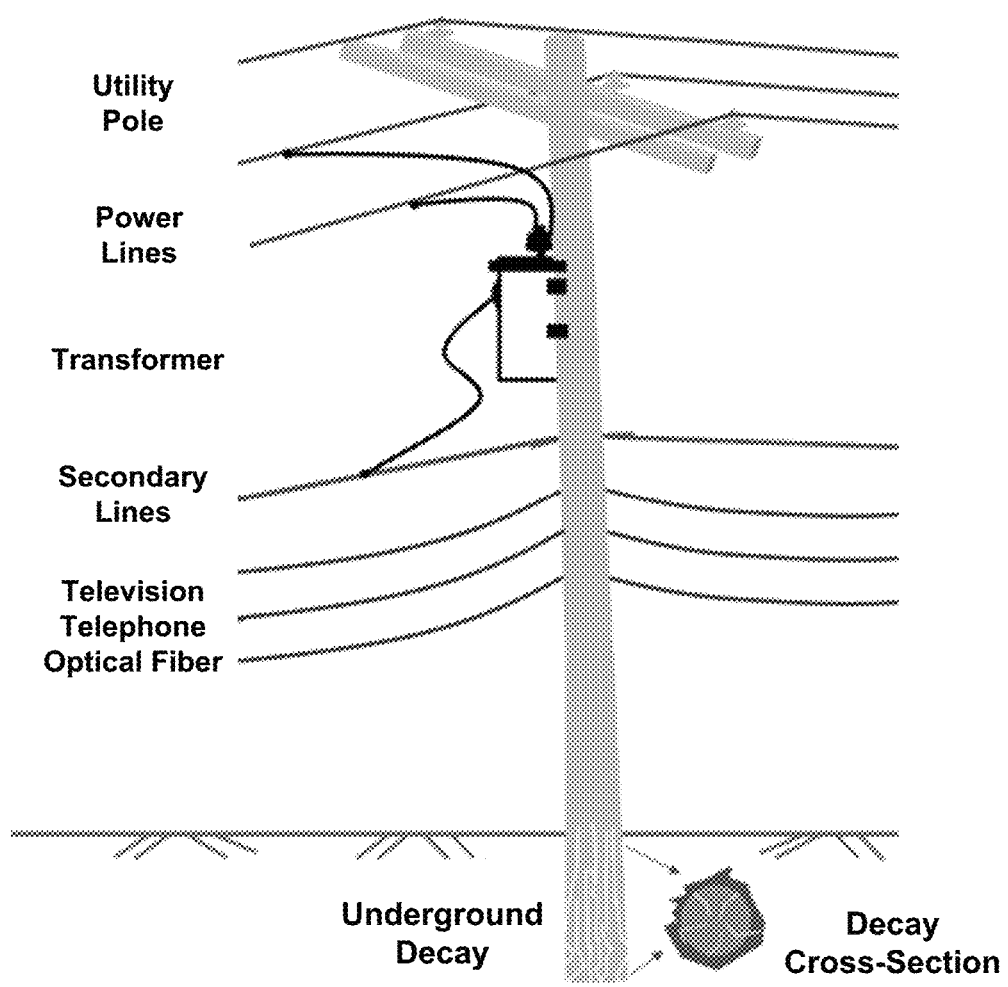
FIG. 2 is a schematic diagram illustrating parts of a wood utility pole known in the art and possible decay of same.

FIG. 2 is a schematic diagram illustrating parts of a wood utility pole known in the art and possible decay of same. According to aspects of the present disclosure, we disclose systems, methods, and structures that provide efficient, continuous, real-time health (integrity) monitoring of wood utility poles and ready identification of damaged (i.e., deteriorated) poles using DFOS over existing telecommunication fiber optic cable suspended on the pole and based on finite element analysis and operational modal analysis. More generally, we disclose systems, methods and structures that enable the non-destructive inspection, evaluation, and identification of damaged utility poles thereby significantly improving utility pole inspection and maintenance efficiency without causing degradation to existing poles or requiring workers to expose themselves to possible hazardous conditions.

As will be understood and appreciated by those skilled in the art, an effective pole inspection strikes a balance between accurately identifying damaged poles that may put both service reliability and/or human life at risk while minimizing the number of still serviceable poles being rejected. In general, there are two types of inspection methodologies employed namely, an intrusive method, and a non-intrusive method. Each method exhibits a different degree of accuracy, efficiency, and cost.

Intrusive method. Intrusive inspection often requires that utility poles are bored or drilled to determine a location and extent of any decay. Utility poles that exhibit signs of internal or external decay are then more fully excavated to determine the extent of decay at the ground line. Several wood inspection products have been developed to perform this kind of inspection.

The intrusive method can locate obvious defects quickly at the ground level but are unable to identify defects above— at an upper or top layer. In addition, such manual procedures have the disadvantage of being subjective, since the evaluation of pole condition depends on subjective experience of an inspector, which often results in rejecting serviceable poles with superficial defects. Additionally, drilling or boring the utility pole can itself cause potential damage to the pole.

Nonintrusive method. Several attempts have been made to improve the accuracy and reliability of pole inspection by relating pole dynamic characteristics such as natural frequencies to pole integrity. For example, a pole integrity determining device based on the relationship between the pole's mechanical characteristics and the natural frequencies generated by a mallet strike has been demonstrated in the art.

Other experimental approaches involved predicting an embedded depth of damage to a pole based on a wave propagation pattern using a network of sensors and impact load on the pole. One experimental study on timber poles used wave propagation from hammer impact excitation to determine the underground depth of poles. Notwithstanding these attempts, such nonintrusive methods only detect defects from accessible areas and require hammer excitations and a network of sensors. Furthermore, these methods are unable to predict remaining service life of poles. Finally, a continuous monitoring of utility pole integrity is not possible with these methods.

Fortunately, systems, methods, and structures according to the present disclosure overcome such infirmities in the art while providing for the continuous monitoring of pole health with high efficiency and accuracy without periodic field check-up or excursion.

Figure 3:
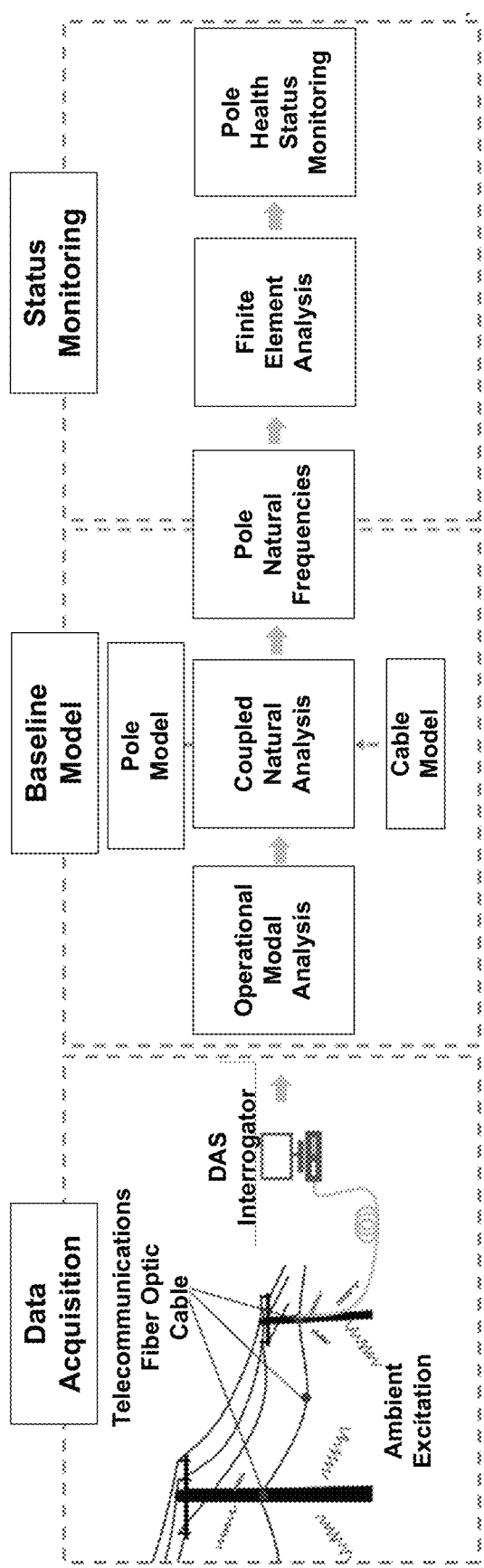
FIG. 3 is a schematic diagram of an illustrative architecture of a utility pole monitoring system using DFOS according to aspects of the present disclosure.

FIG. 3 is a schematic diagram of an illustrative architecture of a utility pole monitoring system using DFOS according to aspects of the present disclosure. With reference to that figure, we note that systems, methods, and structures according to the present disclosure advantageously provide for the automatic and continuous monitoring of wood utility poles and subsequently determining defects therein with a high efficiency and accuracy. As shown in the figure, such systems, methods and structures advantageously utilize existing telecommunication fiber optic cable as a distributed sensor to collect the dynamic response of poles under ambient excitation for natural frequency monitoring, including a data acquisition system, circuitry and software, a baseline model system, circuitry, and software, and a real-time monitoring system, circuitry and software. Flow charts/diagrams for each of the components are disclosed herein.

Data Acquisition Steps

Step 1: Connect DAS interrogator to aerial optical cable suspended by utility pole(s) and collect dynamic strain signal(s) (raw data) along the length of the optical cable.

Step 2: Based on the spatial resolution of distributed acoustic sensing (DAS) interrogator and optical cable length, extract feature points along the cable for operational modal analysis (OMA). For example, with a spatial resolution of 1 m, and an optical cable length of 30 m, there are 30 data points that can be extracted.

Baseline Pole Finite Element Model Steps

Figure 4:
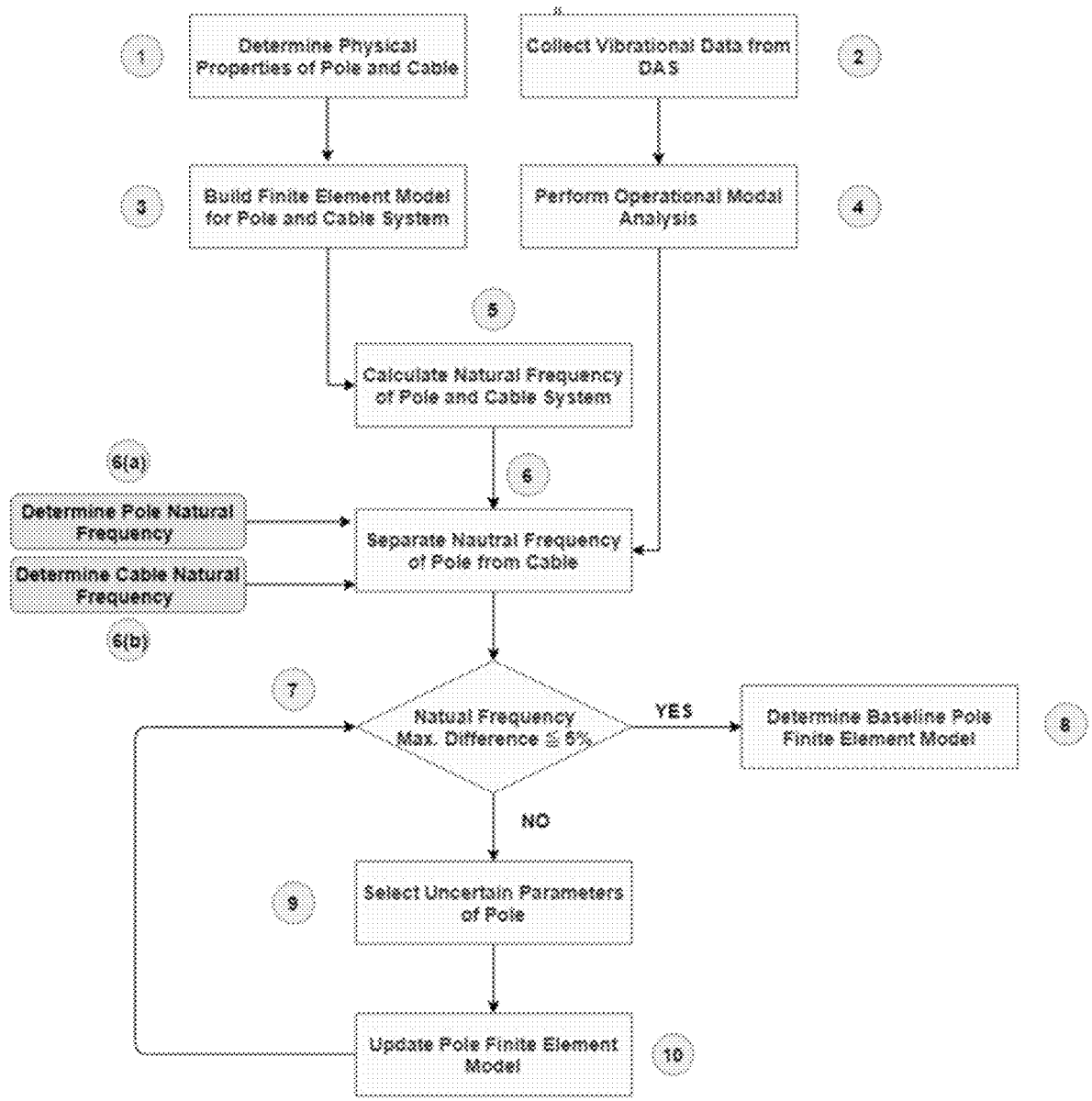
FIG. 4 is a flow diagram of an illustrative baseline pole model development using finite element analysis (FEA) and operational modal analysis from ambient excitation according to aspects of the present disclosure.

FIG. 4 is a flow diagram of an illustrative baseline pole model development using finite element analysis (FEA) and operational modal analysis from ambient excitation according to aspects of the present disclosure.

With reference to that FIG. 4, we describe the following operational steps:

Step 1: The physical properties of utility pole and optical telecommunications cable are determined. For a utility pole, the physical properties determined include pole dimensions, pole class, Young's modulus, weight density, and number of degree of freedom. For an optical telecommunications cable, the physical properties determined includes cable dimensions, cable type, tension, Young's modulus, and number of degree of freedom.

Step 2: Collect raw vibrational data from the optical telecommunication cable using DAS.

Step 3: Based on the physical properties of the utility pole, we build a pole finite element model. Once the finite element model is validated, it will be used to predict any remaining service life of the pole.

Step 4: Based on the raw data collected from the optical telecommunication cable, an operational modal analysis for the utility pole-optical telecommunications cable system is performed. In this step, the natural frequencies of the utility pole and optical telecommunications cable system is obtained.

Step 5: Determine a natural frequency of pole and cable system based on the finite element model and the operational modal analysis.

Step 6: Separate/differentiate utility pole natural frequencies from that of the optical telecommunications cable. Since both the utility pole and optical cable's natural frequencies are included in the processed raw data from DAS, we first need to separate the pole's natural frequencies from that of the cable. The frequencies of the modes of lateral vibration for a linear tapered pole (6a) with free-fixed end boundary condition can be obtained from Equation (1), namely:

$$f_p(i) = \frac{[\phi(i)(1-\varphi)]^2}{2\pi L_p^2}\sqrt{\left(\frac{E_p I_p}{\rho A}\right)} \quad (1)$$

while the cable's natural frequencies (6b) can be obtained from Equation (2), namely:

$$f_c(i) = \frac{(i\pi)^2}{L_c}\sqrt{\frac{E_c I_c}{m}}\sqrt{1+\frac{T L_c^2}{E_c I_c i^2 \pi^2}} \quad (2)$$

Figure 5:
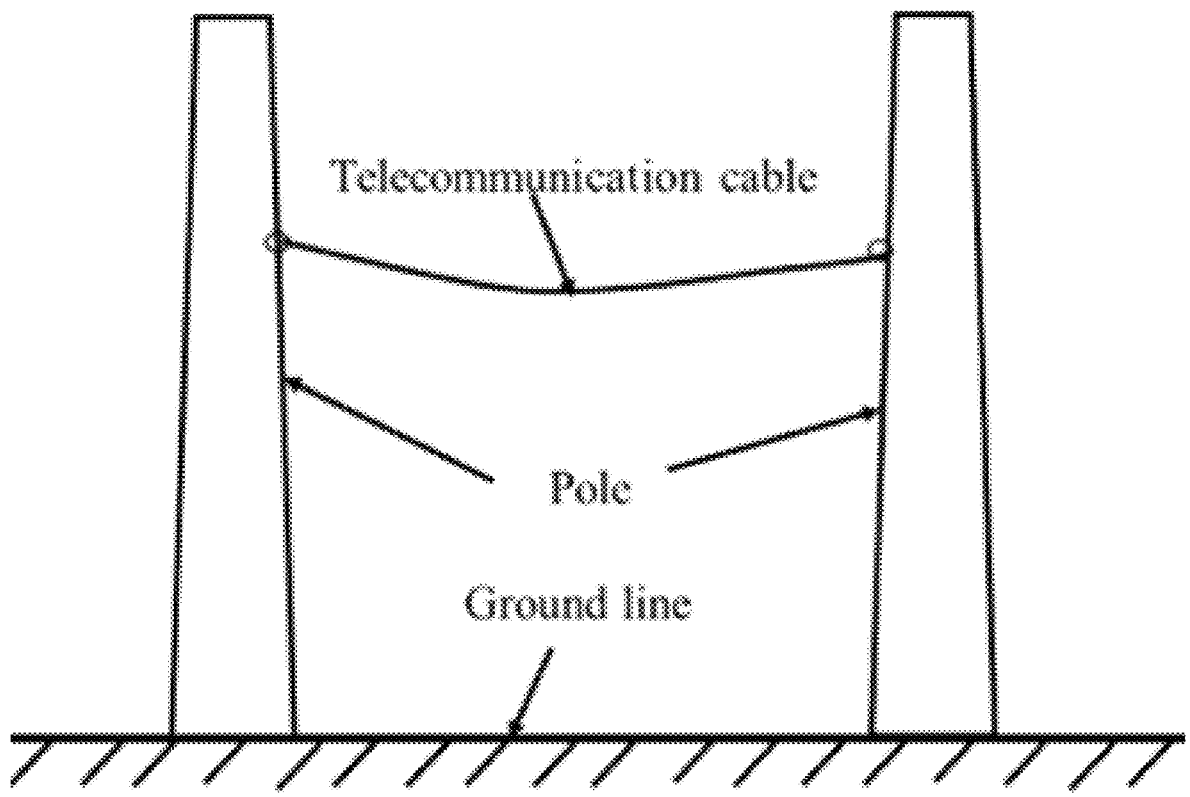
FIG. 5 is a schematic diagram of an illustrative pole-cable system according to aspects of the present disclosure.

Where
ρ is the density of pole;
T is the tension of the cable;
m is the cable mass per unit length;
ϕ(i) is eigenvalue for each mode i;
$f_p(i)$ and $f_c(i)$ are the natural frequency for each mode i, respectively for pole and cable;
$L_p$ and $L_c$ are the length of pole and cable, respectively;
$E_p I_p$ and $E_c I_c$ are the stiffness of the pole and cable, respectively;
A is the cross-sectional area of the pole at the butt;
φ is the amount of taper which is the minimum diameter divided by the maximum diameter, of a pole-cable system as shown schematically in FIG. 5.

Then, based on the results from Step 5, the natural frequencies of the pole are separated/differentiated from the pole-cable system.

Step 7: Determine if the natural frequencies difference of the utility pole obtained from the finite element model when compared with those from the operational modal analysis are within the range of 5%. If the difference is within 5%, then the finite element model can be used as a baseline pole model (8) which will be further used in the pole condition analysis.

Step 9: If the natural frequencies difference is larger than 5%, then select uncertain parameters such as material properties, boundary conditions, pole geometries, etc. Conduct sensitivity analysis for different parameters.

Step 10: Based on the updated uncertain parameters, update the pole finite element model, and check if the natural frequencies difference meet the criteria in Step 7.

Real-Time Monitoring

Figure 6:
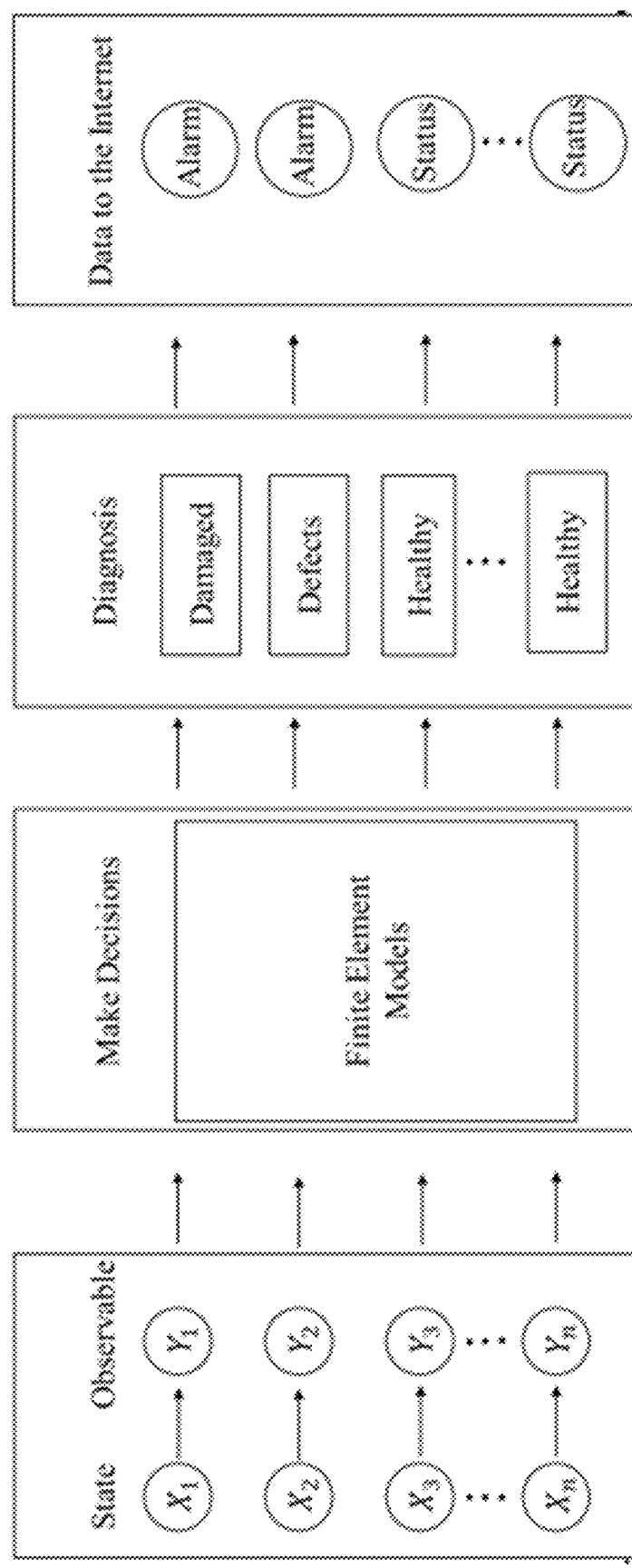
FIG. 6 is a schematic block diagram of an illustrative real-time utility pole monitoring architecture for a system using DFOS according to aspects of the present disclosure.

This system and associated circuitry and software generates a structure of execution status and reports the data to—for example the internet—so that service providers can get easy access to the status of utility poles and provide corresponding actions if an alarm is triggered. The real-time monitoring and reporting process and its details are presented in FIG. 6, which is a schematic block diagram of an illustrative real-time utility pole monitoring architecture for a system using DFOS according to aspects of the present disclosure.

Step 1: Compare the baseline state of the nth pole with the observable state of it from the previous module. Depending on the degree of freedom for the pole, the natural frequencies for the nth pole can be described as $$Xn(f1,f2,f3,f4,\ldots,fn)$$

and the corresponding observable state is:

$$Yn(f1,f2,f3,f4,\ldots,fn).$$

Step 2: This is the decision-making unit. The observable states are imported to the baseline finite element models for damage evaluation and remaining life prediction.

Step 3: Based on the results from the decision-making unit, the diagnosis unit classifies the status of the utility pole.

Step 4: When differences of natural frequency between Xn and Yn meet a pre-determined threshold set by the user, an alarm will be triggered and sent to—for example—the service provider. Otherwise/additionally, the health status may be sent to—for example—a publicly available website for accessible via the Internet for easy, widespread, public access.

At this point, while we have presented this disclosure using some specific examples, those skilled in the art will recognize that our teachings are not so limited. Accordingly, this disclosure should only be limited by the scope of the claims attached hereto.

The invention claimed is:

1. A method of operating a distributed optical fiber sensing system for continuously monitoring utility pole health and early warning, said system comprising:
  a length of optical fiber at least a portion of which is suspended from a utility pole, and
  a distributed optical fiber sensing interrogator in optical communication with the length of optical fiber; said distributed optical fiber interrogator configured to generate optical pulses, introduce them into the optical fiber and receive reflected optical signals from the optical fiber;

said method comprising:
  operating the distributed optical fiber sensing interrogator and collecting the received, reflected optical signals from the optical fiber, said received, reflected optical signals indicative of vibrational activity of the optical fiber and utility pole in combination (pole-fiber system) at a plurality of points along the length of the optical fiber;
  applying, on the received, reflected optical signals from the optical fiber, an operational modal analysis and determining individually, natural frequencies for the utility pole and optical fiber;
  comparing, the operational modal analysis determined natural frequencies for the utility pole with a finite element analysis determined natural frequencies for the utility pole; and
  generating an alert when a change in the determined natural frequencies of the utility pole exceeds a pre-determined threshold, wherein the frequencies of the utility pole and the optical fiber cable are determined according to the following relationships:

for the utility pole, $$f_p(i) = \frac{[\emptyset(i)(1-\varphi)]^2}{2\pi L_p^2} \sqrt{\left(\frac{E_p I_p}{\rho A}\right)}$$

and
for the optical fiber cable, $$f_c(i) = \frac{(i\pi)^2}{L_c} \sqrt{\frac{E_c I_c}{m}} \sqrt{1 + \frac{TL_c^2}{E_c I_c i^2 \pi^2}}$$

where
$\rho$ is the density of the utility pole;
T is the tension of the optical fiber cable;
m is the optical fiber cable mass per unit length;
$\emptyset(i)$ is eigenvalue for each mode i;
$f_p(i)$ and $f_c(i)$ are the natural frequency for each mode i, respectively for the utility pole and optical fiber cable;
$L_p$ and $L_c$ are the length of the utility pole and optical fiber cable, respectively;
$E_p I_p$ and $E_c I_c$ are the stiffness of the utility pole and optical fiber cable, respectively;
A is the cross-sectional area of the utility pole at the butt; and
$\varphi$ is the amount of taper which is the minimum diameter divided by the maximum diameter of the utility pole.

2. The method of claim 1 further comprising:
continuously monitoring the natural frequency of the utility pole; and
generating an alarm when the natural frequency of the pole is below a predetermined threshold.

3. The method of claim 2 further comprising:
monitoring a cut-off natural frequency for the utility pole due to a pole structural change or a material property change of the pole.

4. The method of claim 3 wherein the alarm is generated when the cut-off natural frequency of the pole reaches a pre-determined threshold.

5. The method of claim 1 wherein a plurality of vibrating structures (pole and cable) are determined and cut-off frequencies associated with each are determined.

6. The method of claim 5 wherein the natural frequency of another vibrating structure is subsequently determined from the cut-off frequencies associated with each of the plurality of vibrating structures.

7. The method of claim 6 further comprising generating a utility pole status report and sending that report to an operator.

* * * * *